US006382634B1

(12) United States Patent
Dietle et al.

(10) Patent No.: US 6,382,634 B1
(45) Date of Patent: May 7, 2002

(54) HYDRODYNAMIC SEAL WITH IMPROVED EXTRUSION ABRASION AND TWIST RESISTANCE (75) Inventors: Lannie L. Dietle, Sugar Land; Manmohan S. Kalsi, Houston, both of TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/559,148

(22) Filed: Apr. 26, 2000

Related U.S. Application Data
(60) Provisional application No. 60/131,435, filed on Apr. 26, 1999.

(51) Int. Cl.⁷ ................................................ F16J 15/32
(52) U.S. Cl. ........................ 277/560; 277/549; 277/559; 277/584
(58) Field of Search ................................ 277/549, 551, 277/560, 559, 584

(56) References Cited

U.S. PATENT DOCUMENTS

| | | | |
|---|---|---|---|
| 3,744,805 A | | 7/1973 | Heinrich |
| 4,288,083 A | | 9/1981 | Braconier |
| 4,484,753 A | | 11/1984 | Kalsi |
| 4,610,319 A | | 9/1986 | Kalsi |
| 4,619,534 A | | 10/1986 | Daly et al. |
| 4,865,170 A | * | 9/1989 | Ciepichal ............... 277/549 |
| 5,195,757 A | * | 3/1993 | Dahll .................. 277/551 |
| 5,230,520 A | * | 7/1993 | Dietle et al. ........... 277/549 |
| 5,678,829 A | * | 10/1997 | Kalsi et al. ............ 277/549 |
| 5,711,534 A | * | 1/1998 | Bengoa et al. ......... 277/549 |
| 5,738,358 A | | 4/1998 | Kalsi et al. |
| 5,763,956 A | | 6/1998 | Metz et al. |
| 5,823,541 A | | 10/1998 | Dietel et al. |
| 5,873,576 A | | 2/1999 | Dietle et al. |
| 6,007,105 A | | 12/1999 | Dietle et al. |
| 6,036,192 A | | 3/2000 | Dietle et al. |

FOREIGN PATENT DOCUMENTS

| | | |
|---|---|---|
| EP | 0030085 | 6/1981 |
| EP | 0860351 | 8/1998 |
| GB | 499480 | 1/1939 |
| WO | 9837347 | 8/1998 |

OTHER PUBLICATIONS

"Kalsi Seals Rotary Shaft Seal Catalog," Kalsi Engineering, Inc., Dec. 1, 1993.
Kalsi, M.S., et al. "A Novel Nigh–Pressure Rotary Shaft Seal Facilitates Innovations in Drilling and Production Equipment.", SPE #37627, 1997.

(List continued on next page.)

Primary Examiner—Anthony Knight
Assistant Examiner—Enoch Peavey
(74) Attorney, Agent, or Firm—James L. Jackson; Andrews, Kurth, Mayor, Day Caldwell & Keeton, LLP (57) ABSTRACT A hydrodynamically lubricating seal has a generally circular seal body defining a static sealing surface and having a dynamic sealing lip projecting from the seal body and defining a dynamic sealing surface, a non-hydrodynamic edge and a non-circular angulated flank having a flank angle. The flank angle and the dynamic sealing surface have theoretical intersection being positioned from the non-hydrodynamic edge by a variable distance having a minimum dimension being greater than $\frac{1}{16}$ inch and also having a maximum dimension. The circular seal body defines a theoretical center-line and, when viewed in a longitudinal cross-section taken along the theoretical center-line, a hydrodynamic inlet curve is shown that blends the theoretical intersection between the flank angle and the dynamic sealing surface. This hydrodynamic inlet curve is tangent to the dynamic sealing surface at a location of tangency and has a rate of curvature less than the rate of curvature of a $\frac{1}{8}$ inch radius.

21 Claims, 6 Drawing Sheets

OTHER PUBLICATIONS

Langford, J., and Klasi, M.S. "A New Hydrodynamically Lubricated Bearing Seal for Improving Rock Bit Performance." pp 1–8, vol. 27, Drilling Technology Symposium, American Society of Mechanical Engineers, Book No. G00508–1990.

Ayala, Hugo M., et al. "Seal Design for Reduced Wear in Abrasive Slurries", pp 1–17, FEDSM97–3446; Fluids Engineering Division Summer Meeting, American Society of mechanical Engineers, Jun. 22–26, 1997.

Ayala, Hugo M., et al. "Wear of Elastomeric Seals in Abrasive Slurries," pp 9–21, Wear 220 (1998) Elsevier Science S.A., Aug. 28, 1997.

Kalsi, M.S. et al. "Feasibility Study of a Slated O–Ring as a High Pressure Rotary Seal" ASME Paper No. 72–WA/DE–14 (1972).

Kalsi, M.S. Elastohydrodynamic Lubrication of Offset O–Ring Rotary Seal, ASME Transactions, Journal of Lubrication Technology, vol. 103; Paper 80–C2/Lub–7, American Society of Mechanical Engineers, Jul. 1981. ASME Paper No. 80–C2/Lub–7 (1980).

Horve, Leslie A. "Shaft Seals for Dynamic Applications", pp 338–339; Marcel Dekker, Inc., 1996.

* cited by examiner

HYDRODYNAMIC SEAL WITH IMPROVED EXTRUSION ABRASION AND TWIST RESISTANCE

Applicant hereby claims the benefit of United States Provisional application Ser. No. 60/131,435 filed on Apr. 26, 1999 by William T. Conroy, Lannie L. Dietle, Jeffrey D. Gobeli, and Manmohan S. Kalshi and entitled "Improved Skew-Resisting Hydrodynamic Seal", which provisional application is incorporated herein by reference for all purposes.

BACKGROUND OF THE INVENTION

1. Field of the Invention

The present invention relates generally to hydrodynamically lubricating seals having a hydrodynamic geometry which interacts with lubricant during rotation of a relatively rotatable surface to wedge a film of lubricant into the interface between the seal and the relatively rotatable surface to thereby provide for cooling and wear resistance of the seal and to significantly extend the service life thereof. More specifically, the present invention concerns the provision of a dynamic sealing lip geometry in a hydrodynamic seal which enhances lubricant retention and environmental exclusion of the seal and maintains interfacial contact pressure within the dynamic sealing interface for efficient hydrodynamic lubrication.

2. Description of the Prior Art

The prior-art hydrodynamically lubricated compression—type rotary shaft seals disclosed in U.S. Pat. No. 4,610,319, 5,230,520, 5,678,829, 5,738,358, 5,873,576 and 6,036,192 are known in the industry by the registered trademark "Kalsi Seals", and pertain to products of Kalsi Engineering, Inc. of Sugar Land, Tex.

Figure 1A:
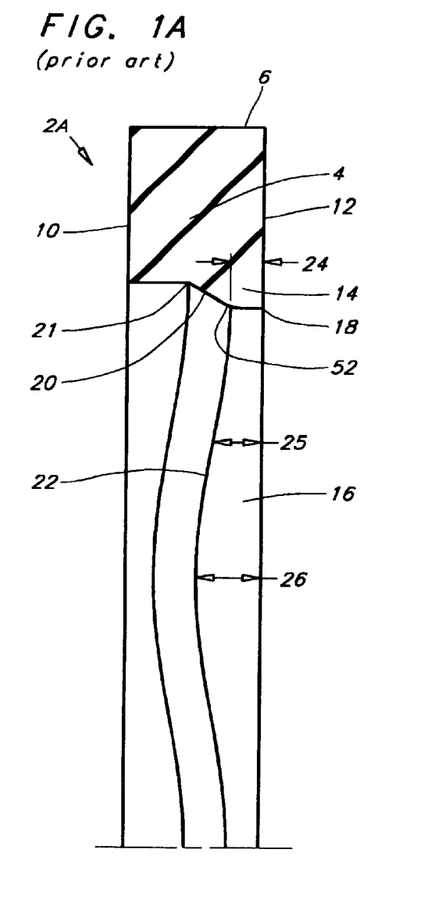
FIG. 1A is a partial longitudinal sectional view of a hydrodynamic seal representing the prior art.
Figure 1B:
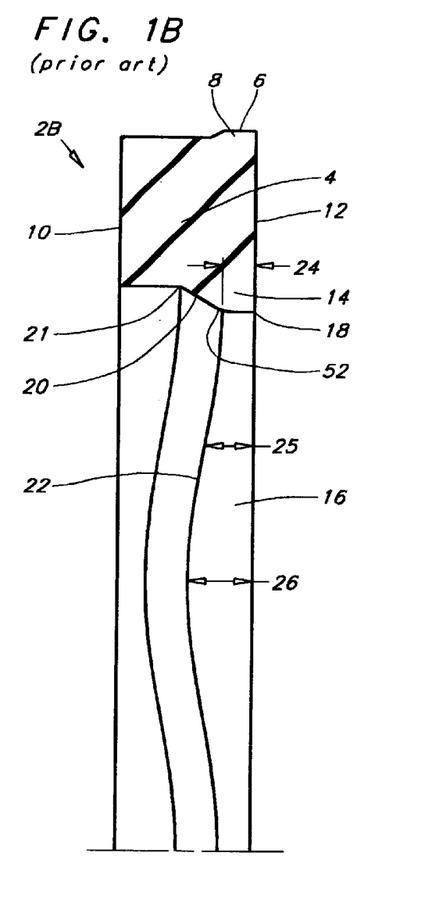
FIG. 1B is a partial longitudinal sectional view of another embodiment of a hydrodynamic seal also representing the prior art.
Figure 1C:
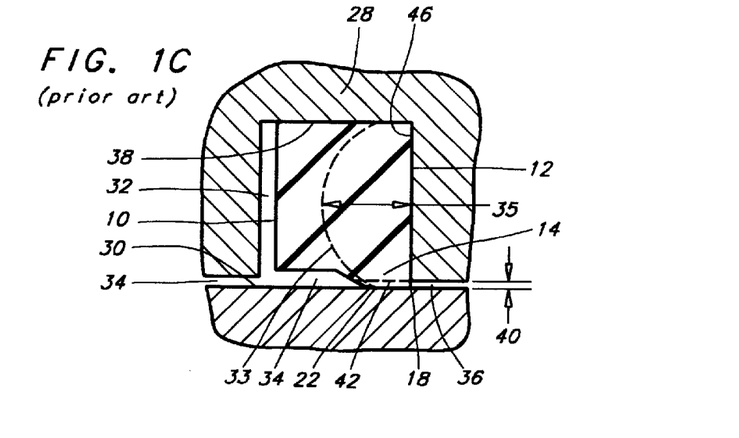
FIG. 1C is a cross-sectional view showing the circular seal gland of a housing and further showing a prior art hydrodynamic seal located with the seal gland and establishing hydrodynamic sealing with a relatively rotatable surface.

FIGS. 1A through 1C of this specification represent the prior art of U.S. Pat. No. 4,610,319 and 5,230,520 which is discussed herein to enhance the reader's understanding of the distinction between prior art hydrodynamic seals and the present invention.

Referring now to the prior art of FIGS. 1A and 1B, there are shown radially uncompressed cross-sectional shapes of the prior art seals, which are known in the industry respectively as "Style A" and "Style B" Kalsi Seals. The seal of FIG. 1A is representative of the commercial embodiment of the technology described in U.S. Pat. No. 4,610,319 and the seal of FIG. 1B is representative of the commercial embodiment of the technology described in U.S. Pat. No. 5,230,520.

Seal 1A and 1B incorporate a seal body 4 which is solid (ungrooved) and generally ring—like. Both seal 1A and seal 1B are designed to be installed in a housing groove which holds the seal in compression against a relatively rotatable surface. Seals 1A and 1B provide a predetermined compression range over a finite axial width.

The difference between the seals 1A and 1B is that the static sealing surface 6 of seal 1A is a cylindrical surface of the seal body 4, while the static sealing surface 6 of seal 1B is formed by a static sealing lip 8 projecting from the seal body 4. Seal 1B is a product improvement over seal 1A which improves interfacial contact pressure and twist resistance per the teachings of U.S. Pat. No. 5,230,520 by providing an approximation of compressive symmetry.

Seal body 4 of seals 1A and 1B each define a first seal body end 10 for facing a lubricant and an second body end 12 for facing an environment. Seals 1A and 1B each incorporate a dynamic sealing lip 14 defining a dynamic sealing surface 16 which has an non-hydrodynamic circular edge 18 which may be abrupt, and which is for environmental exclusion per the teachings of U.S. Pat. No. 4,610,319.

The dynamic sealing lip 14 of seals 1A and 1B have an angulated flank 20 having intersection with the seal body at lip termination point 21. Angulated flank 20 is non-circular, and varies about the circumference of the seal in a wave pattern.

Angulated flank 20 defines a flank angle 60 which is tangent to hydrodynamic inlet hydrodynamic inlet curve 52. Flank angle 60 and dynamic sealing surface 16 have theoretical intersection at theoretical intersection 22. In seals 1A and 1B, angulated flank 20 takes the form of a straight line in the longitudinal cross-sectional view of the seal, as shown, and theoretical intersection 22 is blended by a hydrodynamic inlet curve 52 which is typically a 0.072 inch radius. Theoretical intersection 22 varies in distance from non-hydrodynamic circular edge 18 by a distance represented at the minimum location by minimum dimension 24, and represented at the average location by average dimension 25, and represented at the maximum location by maximum dimension 26. The minimum dimension 24 is known in the industry as the "low point of the wave". By virtue of the waviness of angulated flank 20, the dynamic sealing surface 16 has a wavy edge for hydrodynamic wedging of lubricant into the compressed dynamic sealing interface between dynamic sealing lip 14 and the mating relatively rotatable surface, per the teachings of U.S. Pat. No. 4,610, 319.

In keeping with American drafting third angle projection conventional representation, theoretcial intersection 22 is represented by a line even though the intersection is blended by a radius. (For a discussion of this general blended intersection illustration practice see paragraph 7.36 and FIG. 7.44(b) on page 213 of the classic drafting textbook "Technical Drawing", 10th edition (Prentice-Hall, Upper Saddle River, N.J.: 1997).

One liability of the prior art seals 1A and 1B is that, in keeping with conventional hydrodynamic seal design wisdom, minimum dimension 24 has purposely been kept relatively small throughout the entire Kalsi Seals Style A and Style B product line, to help insure (1) that the entire width of dynamic sealing surface 16 is adequately lubricated by said hydrodynamic wedging of lubricant, and (2) to help maintain a low running torque to minimize heat generation.

Wear damage caused by environmental abrasives, and extrusion damaged caused by high differential pressure, acts axially on the dynamic sealing surface 16, starting at non-hydrodynamic circular edge 18 and progressively working toward theoretical intersection 22. Once the wear damage has progressed to minimum dimension 24, the seal no longer blocks the lubricant leakage path, and ceases to function effectively as a seal, thereby permitting intermixing of the lubricant and the environment.

Referring now to the prior art illustration of FIG. 1C there is shown a cross-sectional view of a rotary shaft sealing assembly showing the installed condition of the prior art seal of FIG. 1B when the pressure of the lubricant 34 is higher than the pressure of the environment 36. FIG. 1C is shown at the minimum dimension 24 between theoretical intersection 22 and non-hydrodynamic circular edge 18. The rotary shaft sealing assembly includes a housing 28 in close proximity to a relatively rotatable surface 30. The housing 28 defines an internal seal installation groove 32 within which is located a ring shaped prior art hydrodynamic seal of the styles discussed in conjunction with FIG. 1B. The prior art seal is compressed between the groove peripheral wall 38 and the relatively rotatable surface 30, resulting in compressive stresses, as determined by finite element analysis, over the region between second seal body end 12 and curved compressive region boundary 33. The compressed region has a compressed region width 35. The interfacial contact pressure at the dynamic sealing interface is determined by the modulus of the seal material, the amount of compression, and the compressed region width 35 of the compressed region of the seal between second seal body end 12 and curved compressive region boundary 33.

The hydrodynamic seal is used to separate the lubricant 34 from the environment 36. When a condition of elevated lubricant pressure exists, the hydrostatic force resulting from the lubricant pressure acting over the area between the groove peripheral wall 38 and the relatively rotatable surface 30 drives the seal against the second groove wall 46, as shown by FIG. 1C. The non-hydrodynamic circular edge 18 is located at the extreme end of the seal. Since the shape of the second seal body end 12 of the seal is of the same general shape as the second groove wall 46, the second seal body end 12 of the seal is generally well supported against the lubricant pressure at all locations except clearance gap 40 which exists between the housing 28 and relatively rotatable surface 30. This clearance gap, which is commonly called the "extrusion gap", must be kept relatively small so that the relatively low modulus seal material can bridge the gap and resist the force resulting from the lubricant pressure acting over the unsupported area of clearance gap 40. At some level of elevated lubricant pressure, the portion of the seal adjacent to clearance gap 40 begins to locally bulge or protrude in to the extrusion gap due to bending and shear stresses in the material of dynamic sealing lip 14. The shear stresses occur in the location of shear line 42, which is represented by a dashed line in FIG. 1C. The bending and shear stress is highest at minimum dimension 24 because it is the weakest location of dynamic sealing lip 14. These stresses, and other stresses described below, can result in progressive extrusion damage to dynamic sealing lip 14 which eventually causes seal failure when the damage reaches theoretical intersection 22.

The phenomenon of seal material bulging into clearance gap 40 is commonly called "extrusion" by the seal industry (Extrusion is not illustrated in FIG. 1C.) The magnitude of extrusion is directly dependent upon several factors, including the size of the clearance gap 40, the pressure of the lubricant 34, and the modulus of the seal material. The modulus of the seal material decreases with temperature, which reduces extrusion resistance. In high pressure sealing applications extrusion can lead to fatigue damage known as "nibbling" or "extrusion damage", which can cause seal material loss and thereby reduce the operational life of the seal. Extrusion damage is caused by cyclic stressing of the seal material which protrudes into the extrusion gap, which ultimately causes the protruding material to fatigue and break away from the sealing element. The cyclic stress which causes extrusion damage is induced by several factors described here—after. Dynamic fluctuations in the size of the extrusion gap due to lateral shaft motion (and other factors) causes high variations in the radial compression of the extruded material, and the resulting cyclic stress causes extrusion damage which looks as if tiny bites have been "nibbled" out of the environmental side of the seal. Lubricant pressure fluctuations cause cyclic stress induced extrusion damage by causing fluctuations in the magnitude of extrusion, and by causing fluctuations in the size of the extrusion gap due to "breathing" (pressure related expansion and contraction) of the housing 28.

Extrusion related fatigue damage can cause eventual seal failure by several different mechanisms. In severe cases, the seal fails catastrophically due to gross material loss when the damage reaches theoretical intersection 22. In less severe cases, localized nibbling can promote the ingestion of environmental abrasives into the dynamic sealing interface and cause eventual seal failure due to wear which progresses from non-hydrodynamic circular edge 18 to theoretical intersection 22 at minimum dimension 24. Nibbling damage can also partially interrupt the hydrodynamic film which may cause the seal to run hotter and suffer from premature compression set and heat—related surface embrittlement.

Although the useful operating pressure range of the present day hydrodynamic rotary shaft seal is unequaled by any other interference type rotary seal, the performance and life are ultimately limited by susceptibility to extrusion and abrasion damage. Many applications would benefit significantly from a rotary seal having the ability to operate at a higher pressure, or having the ability to operate with a larger shaft to housing extrusion gap and tolerate larger lateral and axial shaft motion. Unfortunately, one cannot simply increase the overall durometer hardness of the seal to a very high value to obtain the high modulus needed for increased extrusion resistance because under initial radial compression the high modulus would cause a very high contact pressure at the dynamic sealing interface that would be incompatible with sustained rotary operation due to a high resulting level of self-generated heat.

The contact pressure at the seal to shaft interface is one of the most important factors relating to hydrodynamic performance of the seal because it influences film thickness. As previously stated, hydrodynamic seals are installed with initial radial compression to establish a static seal in the same manner as an O-Ring. A certain minimum level of initial compression is required so that the seal can accommodate normal tolerances, eccentricities, shaft lateral displacement, and seal compression set without loosing contact with the shaft. The contact pressure at the dynamic sealing interface is a related to the percentage of compression and the modulus of elasticity of the seal material, therefore the choice of modulus is limited by the required percentage of initial compression and by the maximum practical interfacial contact pressure. In practice, this has meant that the prior art hydrodynamic seal has been restricted to materials having a durometer hardness of about 90 Shore A, which corresponds to a modulus of elasticity of about 2,600 psi.

The small extrusion gap clearance required for high pressure operation with present day hydrodynamic seals is difficult to implement unless special mechanical contrivance such as the force—balanced laterally translatable seal carrier of U.S. Pat. No. 5,195,754 is used. Deflection and lateral articulation within bearing clearances due to side load often exceed the required seal to housing extrusion gap, and the resulting rotary metal to metal contact between the relatively rotatable surface 30 and the housing 28 damages both and generates frictional heat than can melt the seal and cause failure. An interference type hydrodynamically lubricated rotary seal having higher extrusion resistance so as to be able to tolerate larger extrusion gaps and increased relative motion is therefore highly desirable. Likewise, a seal having the ability to sustain more extrusion and abrasion damage before failure is highly desirable.

Running torque of the prior art seals 1A and 1B is related to lubricant shearing action and asperity contact in the dynamic sealing interface between dynamic sealing surface 16 and the mating relatively rotatable surface 30. Minimum dimension 14 was kept relatively small in the prior art seals to insure that the dynamic sealing interface could be as fully lubricated as possible to minimize asperity contact, and to minimize the area over which lubricant shearing action occurs, in order to minimize running torque and self generated heat. This was believed to be necessary, particularly when the seals are required to seal high lubricant pressure.

Another liability of the prior art seals 1A and 1B is that both can be subject to twisting within the installation groove 32, although seal 1B is more resistant to twisting than the seal 1A owing to having more symmetric compression per the teachings of U.S. Pat. No. 5,230,520. Both are relatively stable against clockwise twisting, and less stable against counter—clockwise twisting, with the twist direction being visualized with respect to FIGS. 1A through 1C. U.S. Pat. No. 5,873,576 and 6,036,192 are directed at helping to minimize such counter—clockwise twisting, albeit in more complex seal configurations.

When twisting occurs in a counter-clockwise direction, the contact pressure in the dynamic sealing interface increases near hydrodynamic inlet curve 52 and decreases near non-hydrodynamic circular edge 18. The resulting increase in interfacial contact pressure near hydrodynamic inlet curve 52 decreases the intended hydrodynamic lubrication, and the resulting decrease in interfacial contact pressure near non-hydrodynamic circular edge 18 reduces the intended exclusionary performance of non-hydrodynamic circular edge 18. Such twisting can subject the seal to skew within the gland, disposing the seal to skew induced wear resulting from environmental impingement on skewed portions of the seal. As a result, seal life is shortened when such counter—clockwise twisting occurs.

In some applications, such as oilfield downhole drilling mud motor sealed bearing assemblies, a relatively large thrust bearing mounting clearance and other factors permits significant relative axial motion between the seal and the relatively rotatable surface, sometimes approaching or exceeding the minimum dimension 24 of dynamic sealing surface 16. This situation can result in rather quick wear of dynamic sealing surface 16 as the axial motion drugs abrasives across the entire minimum dimension 24.

SUMMARY OF THE INVENTION

Briefly, the invention is a generally circular hydrodynamically lubricating seal which has a generally circular seal body which has a static sealing surface. The generally circular seal body also has a dynamic sealing lip projecting from said generally circular seal body and defining a dynamic sealing surface, a generally circular non-hydrodynamic edge and a non-circular angulated flank.

The non-circular angulated flank defines a flank angle, and said flank angle and said dynamic sealing surface having theoretical intersection, said theoretical intersection being positioned from said generally circular non-hydrodynamic edge by a variable distance having a minimum dimension and a maximum dimension; and said minimum dimension is greater than $1/16$ inch and preferably in the range of at least 0.09 inch to at least 0.12 inch. It is desired that the ratio of said maximum dimension divided by said minimum dimension being less than 1.8:1 and it is preferred that the ratio of said maximum dimension divided by said minimum dimension being less than 1.67:1 or less.

The generally circular seal body defines a theoretical center-line, and when said generally circular seal body is viewed in a longitudinal cross-section taken along said theoretical center-liner, a curve blends said theoretical intersection between said flank angle and said dynamic sealing surface, said curve being tangent to said dynamic sealing surface at a location of tangency. It is preferred that the shortest distance between said location of tangency and said generally circular non-hydrodynamic edge being greater than 0.045 inches. Also when said generally circular seal body is viewed in a longitudinal cross-section taken along said theoretical center-line, the intersection of said longitudinal cross-section and said non-circular angulated flank can form a straight line or a curved line formed by said curve. It is desired that rate of curvature of said curve be less than the rate of curvature of a $1/8$ inch radius, and preferred that the rate of curvature of said curve be less than the rate of curvature of a $5/32$ inch radius. Said curve can be tangent to said flank angle. The curve can take any suitable form, such as a radius or a portion of an elliptical curve, or a portion of a parabolic curve, etc.

It is preferred that the seal of the present invention be formed from resilient material having a nominal hardness in the range of from about 73 to about 92 Durometer Shore A.

The seal may have a static sealing lip being defined by said generally circular seal body and defining said static sealing surface.

The non-circular angluated flank defines a number of waves that are preferably less in number than the rounded result of the circumference of the dynamic sealing surface divided by 1.1 inches.

The seal can be configured for face sealing where said dynamic sealing lip projects substantially axially from said generally circular seal body, and alternately the seal can be configured for radial sealing where said dynamic sealing lip projects substantially radially from said generally circular seal body.

The invention is compression—type rotary seal adapted to be received within a circular seal groove defined by first and second spaced seal groove walls and a peripheral seal groove wall, and adapted for sealing with the peripheral seal groove wall and for establishing a sealing interface with a relatively rotatable surface being in opposed spaced relation with the peripheral seal groove wall, and adapted for defining a partition between a lubricant and an environment.

The seal is comprised of a solid (un-grooved) circular seal body composed of sealing material and adapted to be received within the circular seal groove and defining first and second opposed ends, said solid circular seal body being adapted for compression between the peripheral seal groove wall and the relatively rotatable surface.

The seal has a generally circular dynamic sealing projection extending from said solid circular seal body for compressed sealing engagement with the relatively rotatable surface and for compressing said solid circular seal body, and has a wavy hydrodynamic inlet geometry providing for hydrodynamic wedging of a lubricant film between said circular dynamic sealing projection and the relatively rotatable surface responsive to rotation of the relatively rotatable surface. The hydrodynamic inlet geometry is preferably curve having a rate of curvature less than the rate of curvature of a $1/8$ inch radius, such as a radius greater than $1/8$ inch. The circular dynamic sealing projection has a circular exclusionary geometry being defined by one end of said circular dynamic sealing projection and adapted to be exposed to the environment of excluding environment intrusion at the sealing interface of said rotary seal and the relatively rotatable surface. The width of the dynamic sealing projection is greater than the prior art to provide increased resistance to abrasion, extrusion, and twisting.

The seal may also have at least one circular static sealing projection extending from said solid circular seal body and being located in generally opposed relation with said circular dynamic sealing projection for compressed static sealing engagement with the peripheral seal groove wall and for compressing solid circular seal body. The circular static sealing projection may extend from said solid circular seal body less than the extension of said circular dynamic sealing projection from said solid circular seal body. The circular static sealing projection and the circular dynamic sealing projection may each located at one axial extremity of said circular seal body.

One object of the present invention is to provide a hydrodynamically lubricated compression type rotary seal that is suitable for lubricant retention and environmental exclusion. Other objectives of the present invention are to maintain interfacial contact pressure within the dynamic sealing interface in an optimum range for efficient hydrodynamic lubrication while incorporating a dynamic sealing lip that is wider than the prior art.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

In the drawings.

DETAILED DESCRIPTION OF PREFERRED EMBODIMENT

The present invention is a hydrodynamically lubricated compression—type rotary seal that is suitable for lubricant retention and environmental exclusion. It has been engineered such that it's geometry, interfacial contact pressure, and response to relative rotary motion combine to generate a hydrodynamic lubricant film which separates the seal from the mating relatively rotatable surface, and combine the exclude contaminants, and thereby promote long sealing life. The thickness of the film is proportional to the interfacial contact pressure and also dependent on other factors, such as the installed shape of the hydrodynamic geometry and the viscosity of the lubricant. The seals of the present invention are bi-directional; that is to say they achieve efficient hydrodynamic lubrication in response to either clockwise or counter-clockwise relative rotation.

The invention is directed at prolonging seal life in applications where the lubricant pressure may be significantly higher than the environment pressure and/or where the environment contains abrasive particulate matter. The seal of the present invention also resists twisting within the gland when induced to shuttle within the gland due to pressure reversals, which can in the prior art result in abrasive ingestion.

Figure 2A:
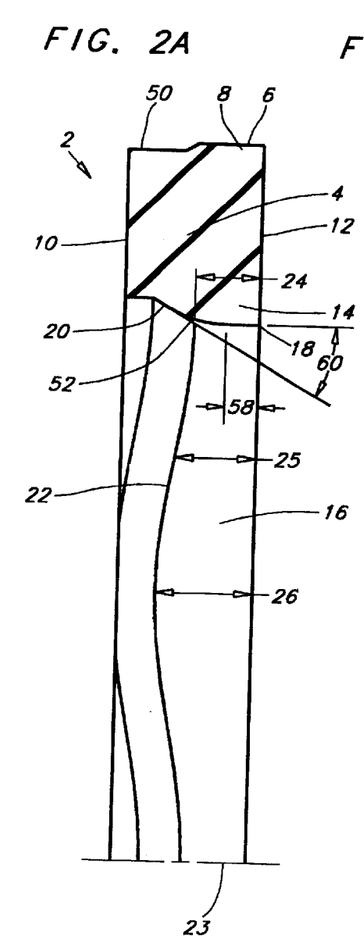
FIG. 2A is a partial longitudinal sectional view of a hydrodynamic seal embodying the principles of the present invention and specifically identifying geometric features such as an angulated flank of the dynamic sealing lip and a flank angle with respect to the dynamic sealing surface of the seal.
Figure 2B:
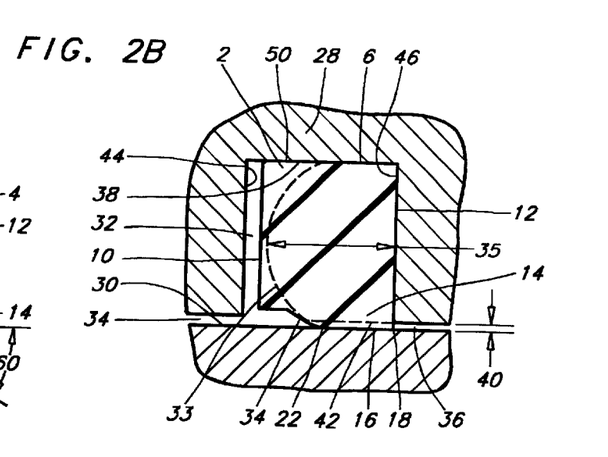
FIG. 2B is a sectional view showing a hydrodynamically lubricated seal of the present invention being located within a circular seal gland of a housing and having interference engagement with the peripheral gland wall and a relatively rotatable surface.

Referring now the drawings, and specifically to FIGS. 2A–2E, there are shown two illustrations that represent the preferred embodiment of this invention. FIGS. 2A and 2B are fragmentary longitudinal cross-sectional illustrations of a hydrodynamically lubricated interference—type rotary seal shown generally a 2. FIG. 2A shows the uninstalled condition of the seal 2, and FIG. 2B illustrates the installed condition of seal 2. Seal 2 is compressed between the peripheral groove wall 38 and the relatively rotatable surface 30, resulting in compressive stresses, as determined by finite element analysis, over the region between second seal body end 12 and curved compressive region boundary 33, said region having a compressed region width 35. The interfacial contact pressure at the dynamic sealing interface is determined by the modulus of the seal material, the amount of compression, and the compressed region width 35 of the compressed region of the seal between second seal body end 12 and curved compressive region boundary 33. In the hydrodynamic seal industry, first groove wall 44 is often referred to as the "lubricant side gland wall", and second groove wall 46 is often referred to as the "environment side gland wall". Likewise, the first seal body end 10 is often referred to as the lubricant end, and the second seal body end 12 is often referred to as the environment end. First groove wall 44 and second groove wall 46 are in spaced, generally opposed relation to each other, and the first seal body end 10 and the second seal body end 12 are in generally opposed relation to each other. Peripheral groove wall 38 and relatively rotatable surface 30 are also in generally opposed relation, and peripheral groove wall 38 is sized to hold the seal 2 in compression against relatively rotatable surface 30.

For orientation purposes, it should be understood that in the longitudinal cross-section of FIGS. 2A–2E, the cutting plane of the cross-section passes through the longitudinal axis of the seal.

For the purpose of establishing consistent nomenclature in this document, the seal "groove" is the void in housing 28 that is defined by peripheral groove wall 38, first groove wall 44 and second groove wall 46. Also for the purpose of establishing consistent nomenclature, the seal "gland" is the enclosed space defined by peripheral groove wall 38, first groove wall 44, second groove wall 46, and relatively rotatable surface 30.

This invention has application where a relatively rotatable surface 30 is sealed with respect to a housing 28 with either the housing 28 or the relatively rotatable surface 30, or both, being rotatable. Although first groove wall 44 and second groove wall 46 are shown to be in fixed, permanent relation with one another, such is not intended to limit the scope of the invention, for the invention admits to other equally suitable forms. For example, housing structure defining first groove wall 44 and/or second groove wall 46 could be detachable from the structure for ease of maintenance and repair, but installed in fixed relation to each other to locate seal 2 when housing 28 is assembled.

Seal 2 may be composed of any one of a number of suitable materials including elastomeric or rubber—like sealing material and various polymeric sealing materials, or any suitable combination thereof, including a composite construction where one portion of the seal is of a different material than the other, however, seal 2 is constructed at least in part from a resilient sealing material such as an elastomer, and in the preferred embodiment shown here is constructed from a single material. The preferred material is an elastomer having a nominal Shore A hardness in the range of 73–92. Seal 2, which has a generally ring shaped solid body, is adapted to be received in an installation groove 32, and used to partition a lubricant 34 from an environment 36 which may contain abrasive particulate matter, and is used to prevent intermixing of the environment into the lubricant, and is used for controlling seal deformation and for controlling interfacial contact force between the seal 2 and the relatively rotatable surface 30. Seal 2 incorporates a dynamic sealing lip 14 of generally circular configuration which defines dynamic sealing surface 16. Seal 2 preferably also incorporates a projecting static sealing lip 8 which defines a static sealing surface 6. Dynamic sealing lip 14 and static sealing lip 8 are oriented in generally opposed relation to each other to minimize the potential of twisting of seal 2 within the seal groove.

The seal 2 of FIGS. 2 and 2A may also be configured for radial or axial (face) sealing. In a radial sealing configuration, static sealing surface 6, dynamic sealing surface 16, peripheral groove wall 38 and relatively rotatable surface 30 may be of substantially cylindrical configuration, and first groove wall 44, second groove wall 46, first seal body end 10, and second seal body end 12 may be of substantially planar configuration. In an axial (face) sealing configuration, static sealing surface 6, dynamic sealing surface 16, peripheral groove wall 38 and relatively rotatable surface 30 may be of substantially planar configuration, and first groove wall 44, second groove wall 46, first seal body end 12, and the second seal body end 12 may be of substantially cylindrical configuration. In large diameter seals, the cross-section of a seal of the present invention is typically limp enough that if made originally for a radially sealing configuration, it can simply be torsionally twisted by 90 degrees to work in a face sealing configuration. In smaller diameter seal implementations, such seals are torsionally stiffer, and it is preferred that they be manufactured to be a radially oriented seal or an axially oriented seal, as may be required by a particular sealing application, as shown in FIGS. 2C–3E.

Figure 2C:
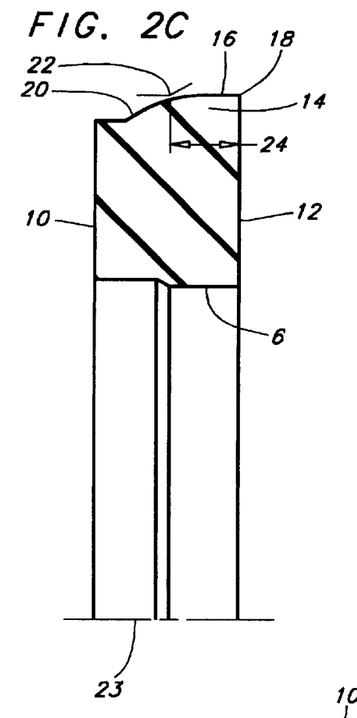
FIGS. 2C–2E are sectional views showing alternative embodiments of the present invention, with the embodiment of FIG. 2C oriented for radial sealing, the embodiment of FIGS 2D oriented for face sealing with a relatively rotatable planar surface.

FIG. 2C shows a seal oriented for radial sealing and having the dynamic sealing lip 14 located on the outer periphery for sealing against a substantially cylindrical relatively rotatable surface such as a housing bore. The static sealing surface 6 and the dynamic sealing surface 16 may be of substantially cylindrical configuration, as shown, and the first seal body end 10 and the second seal body end 12 may be substantially planar configuration, as shown.

Figure 2D:
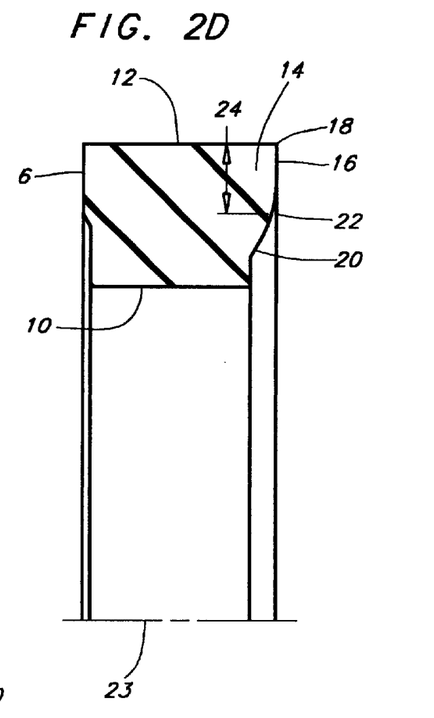
Figure 2E:
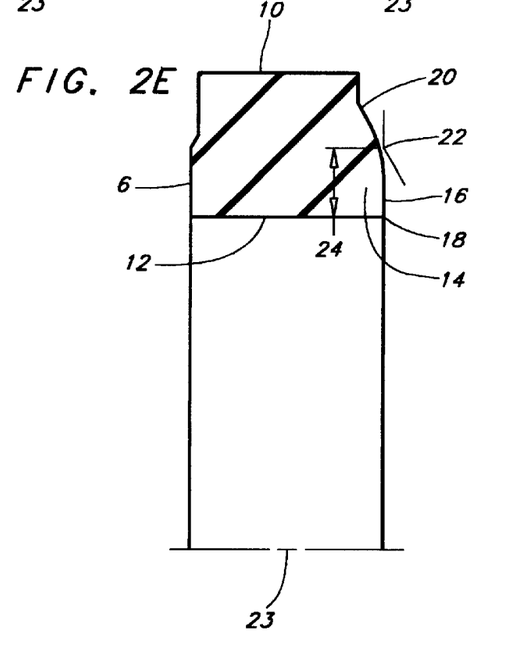

FIGS. 2D and 2E shows seals oriented for axial (face) sealing and having the dynamic sealing lip 14 located in an axial orientation for sealing against a substantially planar relatively rotatable surface such as the shoulder of a shaft. The static sealing surface 6 and the dynamic sealing surface 16 may be of substantially planar configuration, as shown, and the first seal body end 10 and the second seal body end 12 may be of substantially cylindrical configuration, as shown. In FIG. 2D, the dynamic sealing lip 14 is oriented for applications having a lubricant located interior of the dynamic sealing lip 14. In FIG. 2E, the dynamic sealing lip 14 is oriented for applications having a lubricant located exterior of the dynamic sealing lip 14.

Referring again to FIGS. 2A and 2B, housing 28 forms at least part of a lubricant chamber which serves to contain lubricant 34. When relative rotation occurs between housing 28 and relatively rotatable surface 30, the circumferential direction of relative rotation is normal to the plane of the cross-section of FIGS. 2A and 2B, and seal 2 remains stationary relative to housing 28 and maintains a static sealing interface with housing 28, and relatively rotatable surface 30 slips with respect to dynamic sealing surface 16 at a given rotational velocity "V" and the interface between seal 2 and the relatively rotatable surface 30 becomes a dynamic sealing interface.

Seal 2 incorporates a dynamic sealing 14 defining a dynamic sealing surface 16 which has an non-hydrodynamic circular edge 18 for environmental exclusion per the teachings of U.S. Pat. No. 4,610,319.

The dynamic sealing lip 14 of seal 2 defines an angulated flank 20 that is non-circular, and varies about the circumference of the seal in a wavy pattern of any suitable configuration. Angulated flank 20 defines a flank angle 60 which is tangent to hydrodynamic inlet curve 52. Flank angle 60 and dynamic sealing surface 16 have theoretical intersection at theoretical intersection 22. In seal 2, angulated flank 20 takes the form of a straight line in the longitudinal cross-sectional view of the seal, as shown, and theoretical intersection 22 is blended by a hydrodynamic inlet curve 52 which is preferably has a curvature that is less than the curvature of a ⅛ inch radius (For example the rate of curvature of a ¼ inch radius is less than the rate of curvature of a ⅛ inch radius.) Hydrodynamic inlet curve 52 may take any suitable form for producing hydrodynamic wedging, such as a radius, a compound curve, a portion of an ellipse, a portion of a sine wave curve, a portion of a parabolic curve, a portion of a cycloid curve, a portion of witch/versiera curves, or combinations thereof. Theoretical intersection 22 varies in distance from non-hydrodynamic circular edge 18 by a distance represented at the minimum location by minimum dimension 24, and represented at the average location by average dimension 25, and represented at the maximum location by maximum dimension 26.

By virtue of the waviness of angulated flank 20, the dynamic sealing surface 16 has a wavy edge for hydrodynamic wedging of lubricant into the dynamic sealing interface between dynamic sealing lip 14 and the mating relatively rotatable surface 30 per the teachings of U.S. Pat. No. 4,610,319.

In this preferred embodiment minimum dimension 24 from non-hydrodynamic circular edge 18 to theoretical intersection 22 is greater than 1/16 inch. By increasing average dimension 25 over that of the prior art, a number of benefits occur. First of all, contrary to expectation and prior engineering judgement, when average dimension 25 is increased, the average interfacial contact pressure between the dynamic sealing lip 14 and relatively rotatable surface 30 actually decreases. The contact pressure at the interface between the seal 2 and the relatively rotatable surface 30 is one of the most important factors relating to hydrodynamic performance of the seal because it influences film thickness. The average contact pressure goes down as the average dimension 25 increases, and it is possible to hydrodynamically lubricate a minimum dimension 24 which is wider than ever had been used in the prior art.

The reason that the average interfacial contact pressure goes down as a function of increasing average dimension 25, is because the proportion of compressed region width 35 to average dimension 25 decreases as average dimension 25 increases.

Contrary to expectation and prior engineering judgement, it is possible to increase minimum dimension 24 substantially over the prior art without substantially increasing the running torque of the seal, even at extremely high pressure, because the lubrication is better than previously thought possible.

In tests run by the inventor and his associates, in order to systematically explore key seal design variables, a 2.75 inch seal having a minimum dimension 24 that was 50% wider than the prior art, but still using the same 0.072" hydrodynamic inlet radius typical to the majority of the prior art, ran successfully at 2600 psi differential pressure while exhibiting a torque only slightly higher than the seals of the prior art. The values recorded were as follows:

| RPM | Torque, inch-lbs | |
| --- | --- | --- |
| Prior art seal | 150 | 90 |
| 50% wider seal | 150 | 115 (28% higher than prior art seal) |
| Prior art seal | 325 | 81–85 |
| 50% wider seal | 325 | 95 (12% to 17% higher than prior art seal) |

Only at low speeds of 60–80 rpm did the torque of the 50% wider seal become about 50% higher than the prior art seal. At low speeds, increased torque isn't as important, however, because self-generated heat is a function of both speed and torque. In other words, if two seals are running at the same torque, but different speeds, the one with the higher speed will generate more heat. As can be seen from the above data the torque difference between the prior art seal and the 50% wider seal diminished as a function of speed. It was not obvious to the inventors that the running torque of the present invention would approach the running torque of the prior art seal at higher rpm, and the test results were contrary to expectations and the previous engineering judgement which had been used to design the prior art seals. The conventional wisdom within the company was that torque would simply increase proportional to the width of the contact footprint.

Wear damage caused by environmental abrasives, and extrusion damage caused by high differential pressure, acts axially on the dynamic sealing surface 16, starting at non-hydrodynamic circular edge 18 and progressively working toward theoretical intersection 22. Once the wear damage has progressed to minimum dimension 24, the seal no longer blocks the lubricant leakage path, and ceases to function effectively as a seal. By making the minimum dimension 24 50% wider, the seal can withstand approximately 50% more extrusion and abrasion damage, compared to the prior art, with only a small increase in torque.

The reasons why the torque only increases by a small amount when minimum dimension 24 increases by 50% are two-fold. First, the interfacial contact pressure goes down as the width of the lip increases, as described above. Secondly, even though minimum dimension 24 increases by 50%, the average dimension 25 increases by a much smaller percentage. Therefore the increased amount of area in the dynamic sealing interface (where lubricant shear and potential asperity contact occur) increases by much less than 50%.

Not only can the present invention tolerate more extrusion and wear damage compared to the prior art, it is less susceptible to extrusion damage because the maximum shear stress at shear line 42 decreases as minimum dimension 24 increases. Also, the present invention can tolerate more axial shaft motion because the minimum dimension 24 is larger in proportion to the axial motion, compared to the prior art.

The seal 2 of the present invention is less subject to counter-clockwise twisting within the gland because the increased dimension of minimum dimension 24, compared to the prior art, provides a wider contact with the relatively rotatable surface 30. The improved resistance to counter-clockwise twisting helps to maintain adequate interfacial contact pressure near non-hydrodynamic circular edge 18 and thereby helps to maintain exclusionary performance. The improved resistance to counter-clockwise twisting helps also helps to prevent twisting-induced high interfacial contact pressure near theoretical intersection 22 and thereby helps to maintain hydrodynamic lubrication performance. As a result, improved seal life is attained when such counter-clockwise twisting is minimized by virtue of increasing minimum dimension 24, average dimension 25 and maximum dimension 26 over that of the prior art.

Experiments conducted by the inventors and their associates has confirmed that the cooperative features and benefits of the present invention (contrary to conventional wisdom associated with the engineering that occurred when designing the prior art seals) cause the present invention to operate hydrodynamically even when the minimum dimension 24 is increased 100% over the prior art. This was not obvious in advance, and was contrary to past engineering judgement.

Because the rebated surface 50 is in close proximity to, or in contact with, peripheral groove wall 38, reaction of rebated surface 50 against peripheral groove wall 38 mechanically stabilizes the seal against clockwise twisting of the seal, per the teachings of commonly assigned U.S. Pat. No. 5,230,520, with the clockwise direction being visualized in reference to FIGS. 2A and 2B.

When the pressure of the environment 36 is higher than the pressure of the lubricant 34, the seal shuttles in the gland until the first seal body end 10 is supported by first groove wall 44, and the environment pressure acts across the unsupported area of the dynamic sealing lip 14. In the present invention, the proportional difference between the minimum and maximum stiffness of the dynamic sealing lip 14 is less than the prior art, and minimum dimension 24 is greater than the prior art, therefore the seal 2 of the present invention is better able to tolerate conditions where the environment 36 is higher than the pressure of the lubricant 34, compared to prior art seals. For example, in the prior art, the ratio of maximum dimension 26 divided by minimum dimension 24 is typically 2:1, and in some cases even higher. In the present invention, it is preferred that the ratio of maximum dimension 26 divided by minimum dimension 24 should be less than 1:8:1 and preferably 1:67:1 or less. As can be seen in the fragmentary longitudinal cross-sectional illustration of FIG. 2A, the intersection of angulated flank 20 and dynamic sealing surface 16 is blended by a hydrodynamic inlet curve 52 which is preferably tangent to both. For orientation purposes, it should be understood that in the longitudinal cross-section of FIGS. 2 and 2A, the cutting plane of the cross-section is taken along the longitudinal axis of the seal; i.e. the theoretical center-line defined by the generally circular seal body lies within the cutting plane. In the preferred embodiment of the present invention, the hydrodynamic inlet curve, which is hydrodynamic inlet curve 52, as viewed in longitudinal cross-section, is larger than has been employed in those prior art seals which define a hydrodynamic inlet radius when viewed in longitudinal cross-section. In other words the rate of curvature of hydrodynamic inlet curve 52 in the preferred embodiment is less than the curvature of the prior art hydrodynamic inlet curve. When the seal 2 is compressed against the against relatively rotatable surface 30, hydrodynamic inlet curve 52 is intended to provide a gradually converging relationship with relatively rotatable surface 30 for efficient wedging of lubricant into the dynamic sealing interface between dynamic sealing surface 16 and relatively rotatable surface 30.

As part of the research and development associated with creation of the present invention, Kalsi Engineering, Inc. has performed extensive finite element analysis of hydrodynamic seals in order to understand the effect of seal geometry on contact pressure, and in order to understand the significance of contact pressure in regards to hydrodynamic and exclusionary performance. This analysis has shown that the size of hydrodynamic inlet curve 52 plays a an important role in establishing an optimum contact pressure profile. To achieve an improved interfacial contact pressure profile over the prior art, hydrodynamic inlet curve 52, when viewed in longitudinal cross-section, should have a rate of curvature less than that of a 1/8 inch radius and preferably should have a rate of curvature less than that of a 5/32 radius; thus having a curvature rate that is smaller than used in the design and manufacture of prior art solid seals. For example, a 5/32 inch radius, which has a rate of curvature less than that of a 1/8 inch radius, would be preferred over the 1/8 inch radius. When a very large curve is employed for hydrodynamic inlet curve 52, the tangency 56 between hydrodynamic inlet curve 52 and dynamic sealing surface 16 in the uncompressed condition of the seal can come rather close to the non-hydrodynamic circular edge 18 of dynamic sealing surface 16 at the minimum dimension 24, as shown by abrupt edge to tangency width 58. However, when the dynamic sealing lip 14 is compressed against relatively rotatable surface 30, the interfacial contact footprint attains a usefully wide dimension because a significant portion of hydrodynamic inlet curve 52 becomes flattened against relatively rotatable surface 30.

Hydrodynamic inlet curve 52 may take other specific form that a portion of a circle without departing from the spirit or scope of the invention; for example hydrodynamic inlet curve 52 could alternately be a portion of an ellipse. If hydrodynamic inlet curve 52 were incorporated as a portion of an ellipse, it would be preferred that the average of the major and minor elliptical axes should be greater than 1/8 and preferably 5/32 inch or larger.

Figure 3:
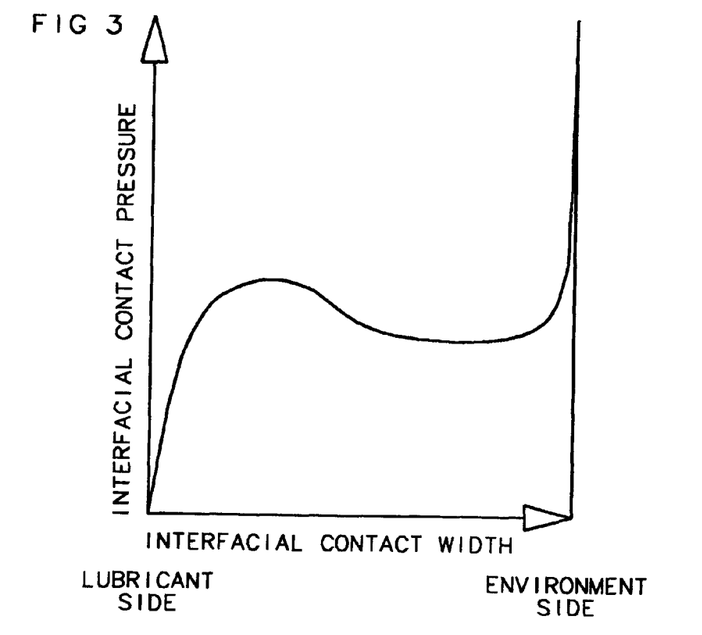
FIGS. 3 and 4 are graphical presentations of finite element analysis predictions of the contact pressure that occurs at the interfacial contact footprint between a seal and a relatively rotatable surface, with FIG. 3 being representative of the typical flank angle/dynamic sealing surface hydrodynamic curvature size of the prior art, and FIG. 4 being representative of the hydrodynamic curvature size preferred for the present invention.
Figure 4:
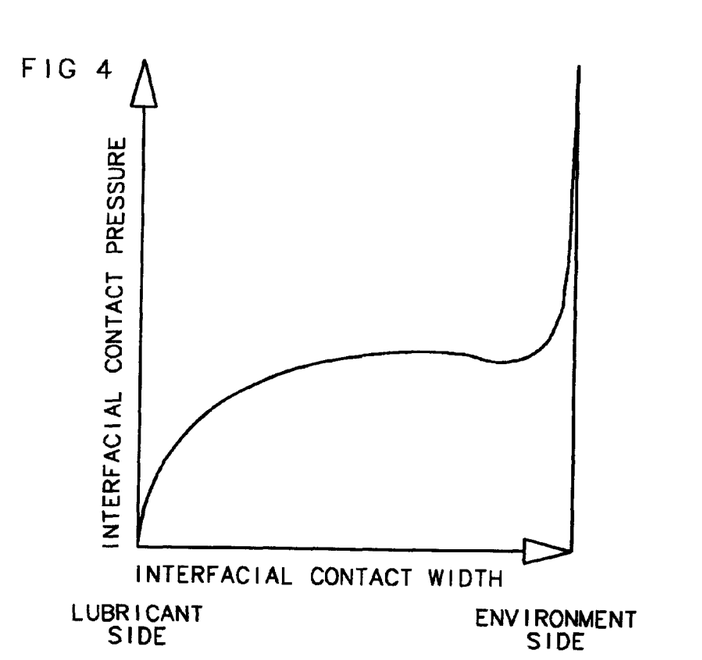

FIGS. 3 and 4 are graphs of finite element analysis predictions of the contact pressure that occurs at the interfacial contact footprint between a seal and a relatively rotatable surface, with the left side of the graphs being oriented towards the lubricant side of the interfacial contact footprint, and the right side of the graphs being oriented towards the environment side of the interfacial contact footprint. The graphs are included to illustrate how interfacial contact pressure varies as a function of the dimension of hydrodynamic inlet curve 52, with FIG. 3 being representative of the typical hydrodynamic inlet curve of the prior art, and FIG. 4 being representative of the larger hydrodynamic inlet curve preferred for the present invention. Both graphs are representative of a seal at 300 degrees Fahrenheit, with the pressure of the environment 36 being 100 psi greater than the pressure of the lubricant 34. Both graphs are representative of interfacial contact predictions taken at a location that is aligned with the axis of the seal.

FIGS. 3 and 4 compare the contact pressure profiles of seals having different hydrodynamic inlet curves. The smaller radius of FIG. 3 produces an undesirably steep lubricant-side contact pressure slope, and a distinct saddle shape. The larger radius of FIG. 4 produces a more gradual lubricant side slope, and very little "saddle"; i.e. a very desirable contact pressure profile. Analysis and testing indicates that it is very desirable for hydrodynamic inlet curve 52 to have a rate of curvature less than that of a 1/8 inch radius in order to obtain an optimum interfacial contact pressure profile and enhanced lubrication of the sealing interface. This can be important with the extremely wide lips of the present invention. Analysis shows that the contact pressure profile is similar to FIG. 4 for radii spanning the range from 0.13 inch to 0.19 inch, with 0.19 inch being the largest radius analyzed; i.e. the curve having the least rate of curvature.

As can be seen from FIG. 4, the hydrodynamic inlet curve 52 preferred for the present invention; i.e. having a rate of curvature less than that of a 1/8 inch radius, provides a very gradual rise in interfacial contact pressure from the lubricant side to near the environment side of the dynamic sealing interface, and produces an increase in interfacial contact pressure at the environment side of the dynamic sealing interface. This optimized contact pressure profile provides enhanced hydrodynamic lubrication, as verified by lower torque signatures observed in comparison testing of large radius seals and small radius seals having the same minimum dimension 24. The large hydrodynamic inlet curve 52 (i.e. a curve having a small rate of curvature) of the preferred embodiment produces a stronger wedging action by virtue of providing a more gradual convergence between the seal 2 and the relatively rotatable surface 30. The large hydrodynamic inlet curve 52 of the preferred embodiment, by virtue of the improved contact pressure profile, should also permit the use of somewhat harder sealing materials, compared to the prior art.

This is particularly important in the seals of the present invention which have a minimum dimension 24 that is 0.12 inch or more, but also provides reduced torque and self-generated heat in seals having a minimum dimension 24 greater than 1/16 inch but less than 0.12 inch.

The advantage of the larger radius is also considered to be important in hydrodynamic seals where the pressure of the environment 36 is higher than the pressure of the lubricant 34, because the lubricant side contact pressure can tend to increase under reverse pressure, which can tend inhibit hydrodynamic action.

From FIG. 3 one can also observe that smaller hydrodynamic inlet curve of the prior art produces less interfacial contact pressure in the middle of the interfacial contact footprint compared to near the lubricant edge; this adverse phenomenon is almost entirely absent when the larger hydrodynamic inlet curve of the present invention is used, as shown in FIG. 4, which means the larger hydrodynamic inlet curve is more effective as a hydrodynamic inlet.

Most of the present day compression-type hydrodynamic seal lubrication theory was developed and confirmed using slanted O-Rings, as related in ASME Paper No. 72-WA/DE-14 (1972) and ASME Paper No. 80-C2/Lub 7 (1980). Such theory indicates that hydrodynamic lubrication can be increased by increasing the number of waves to make the pitch of each wave shorter. This theory has been used in the design of the hydrodynamic seals represented by FIGS. 1A–1C, which have relatively short pitch waves, where the convergence curvature between the seal and the relatively rotatable surface has been visualized in the axial direction during the design process, because that is the way the hydrodynamic inlet curve 52, which has been called the hydrodynamic inlet radius, has always been represented in manufacturing drawings. In regard to the present invention, the inventors have theorized that a longer pitch wave can provide an improved convergence angle between the seal and the relatively rotatable surface, when the convergence angle is viewed in the circumferential direction, resulting in better lubrication. Recent experiments with short pitch and long pitch seals have indicated that the use of a wave pitch longer than normal can produce a useful increase in hydrodynamic lubrication in seals with bi-directional molded-in hydrodynamic waves. It is therefore preferred that the wave pitch be longer than the circumference of the dynamic sealing surface 16 in inches divided by the number of waves, where the number of waves is calculated as the rounded result of the circumference of the dynamic sealing surface 16 in inches divided by one inch. In the preferred embodiment of the present invention, the numbers of waves should be in the range of the rounded result of the circumference of dynamic sealing surface 16 in inches divided by 1.1 to 1.5 inches.

The embodiment of FIGS. 2A and 2B can be simplified, if desired, by not employing the preferred dimensions of hydrodynamic inlet curve 52 or the preferred wave pitch, or the static sealing lip 8, but retaining the invention feature of employing a minimum dimension 24 which is greater than $1/16$ inch and preferably 0.09 inch or greater. In seals which do not employ the preferred dimensions of hydrodynamic inlet curve 52, it is preferred that abrupt edge to tangency width 58 be greater than 0.045 inches.

As will be readily apparent to those skilled in the art, the present invention may be produced in other specific forms without departing from its spirit or essential characteristics. The present embodiments are therefore to be considered as illustrative and not restrictive.

FIGS. 2C–2E show slight variations of the preferred embodiment. For orientation purposes, it should be understood that in the longitudinal cross-section of FIGS. 2C–2E, the cutting plane of the cross-section passes through the longitudinal axis of the seal. The non-hydrodynamic circular edge 18 of dynamic sealing surface 16 is circular for exclusionary purposes in the seals of FIGS. 2C–2E.

FIG. 2C is oriented for radial sealing and FIGS. 2D & 2E are oriented for axial (face) sealing. Note that the angulated flank 20 of the seals of 2C–2E is non-circular for hydrodynamic lubrication purposes, per the teachings of U.S. Pat. No. 4,610,319, and therefore the width of the dynamic sealing surface 16 from varies about the circumference of the seals, as discussed in conjunction with the seal of FIG. 2A.

FIG. 2C shows a seal oriented for radial sealing and having the dynamic sealing lip 14 located on the outer periphery for sealing against a substantially cylindrical relatively rotatable surface such as a housing bore. The static sealing surface 6 and the dynamic sealing surface 16 may be of substantially cylindrical configuration, as shown, and the first seal body end 10 and the second seal body end 12 may be of substantially planar configuration, as shown.

FIGS. 2D and 2E show seals oriented for axial (face) sealing and having the dynamic sealing lip 14 located in an axial orientation for sealing against a substantially planar relatively rotatable surface such as the shoulder of a shaft. The static sealing surface 6 and the dynamic sealing surface 16 may be of substantially planar configuration, as shown, and the first seal body end 10 and the second seal body end 12 may be of substantially cylindrical configuration, as shown. In FIG. 2D, the dynamic sealing lip 14 is oriented for applications having a lubricant located interior of the dynamic sealing lip 14. In FIG. 2E, the dynamic sealing lip 14 is oriented for applications having a lubricant located exterior of the dynamic sealing lip 14.

Figure 5A:
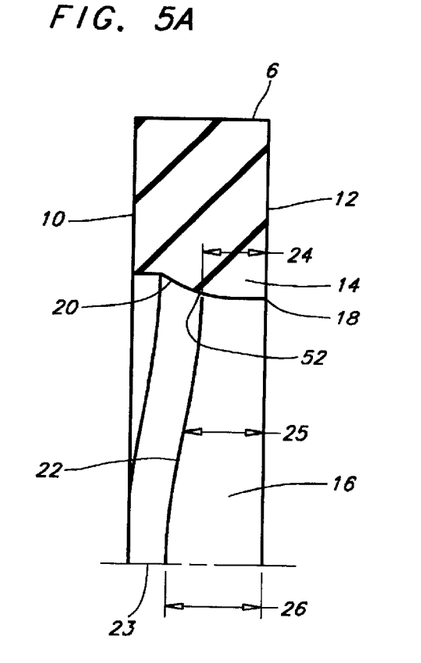
FIGS. 5A–5D are cross-sectional illustrations showing bi-directional hydrodynamically lubricated generally circular compression—type rotary seals representing alternative embodiments of the present invention and being shown in their uncompressed state.
Figure 5B:
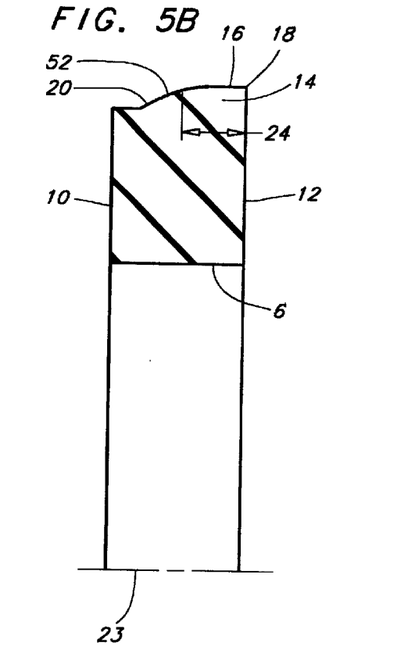
Figure 5C:
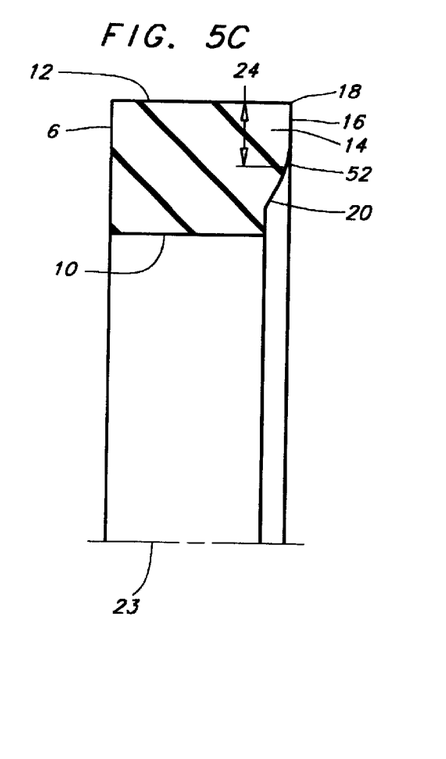

In the alternative embodiments of FIGS. 5–5C, minimum dimension 24 from non-hydrodynamic circular edge 18 to theoretical intersection 22 is greater than $1/16$ inch and preferably 0.09 inch or greater, thereby providing improvements in extrusion resistance and abrasion resistance as discussed in conjunction with the preferred embodiment FIGS. 2 and 2A. Counter-clockwise twist resistance is also improved over the prior art of U.S. Pat. No. 4,610,319 owning to the minimum dimension 24 being wider compared to the prior art.

Description Of The Simplified Alternate Embodiments Of FIGS. 5a–5d

Referring now to FIG. 5A–5D, bi-directional hydrodynamically lubricated generally circular compression-type rotary seals representing alternative embodiments of the present invention are shown in their uncompressed state. The seals of FIGS. 5A–5D are adapted to be received within a circular seal gland defined by first and second spaced seal groove walls, a peripheral groove wall, and a relatively rotatable surface. The seals of FIGS. 5A–5D are a simplification of the preferred embodiments of FIGS. 2A & 2C–2E which do not incorporate the static sealing lip of the preferred embodiment. For orientation purposes, it should be understood that in the longitudinal cross-section of FIGS. 5A–5D, the cutting plane of the cross-section passes through the longitudinal axis of the seal. As with the seals of FIGS. 2A–2E, the non-hydrodynamic circular edge 18 of dynamic sealing surface 16 is circular for exclusionary purposes in the seals of FIGS. 5A–5D.

Figure 5D:
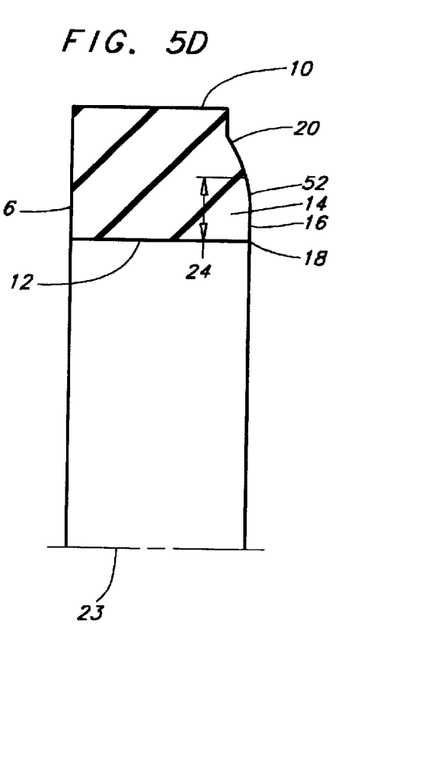

FIGS. 5A and 5B are oriented for radial sealing and FIGS. 5C & 5D are oriented for axial (face) sealing. Note that the angulated flank 20 of the seals of FIGS. 5A–5D is non-circular for hydrodynamic lubrication purposes, per the teachings of U.S. Pat. No. 4,610,319, and therefore the width of the dynamic sealing surface 16 from varies about the circumference of the seals, having as can be seen in FIG. 5A, a width from non-hydrodynamic circular edge 18 to theoretical intersection 22 having a minimum dimension 24, an average dimension 25 and a maximum dimension 26.

FIG. 5A shows a seal oriented for radial sealing and having the dynamic sealing lip 14 located on the inner periphery for sealing against a substantially cylindrical relatively rotatable surface such as a shaft. The static sealing surface 6 and the dynamic sealing surface 16 may be of substantially cylindrical configuration, as shown, and the first seal body end 10 and the second seal body end 12 may be of substantially planar configuration, as shown.

FIG. 5B shows a seal oriented for radial sealing and having the dynamic sealing lip 14 located on the outer periphery for sealing against a substantially cylindrical relatively rotatable surface such as a housing bore. The static sealing surface 6 and the dynamic sealing surface 16 may be of substantially cylindrical configuration, as shown, and the first seal body end 10 and the second seal body end 12 may be of substantially planar configuration, as shown.

FIGS. 5C & 5D show seals oriented for axial (face) sealing and having the dynamic sealing lip 14 located in an axial orientation for sealing against a substantially planar relatively rotatable surface such as the shoulder of a shaft. The static sealing surface 6 and the dynamic sealing surface 16 may be of substantially planar configuration, as shown, and the first seal body end 10 and the second seal body end 12 may be of substantially cylindrical configuration, as shown. In FIG. 5C, the dynamic sealing lip 14 is oriented for applications having a lubricant located interior of the dynamic sealing lip 14. In FIG. 5D, the dynamic sealing lip 14 is oriented for applications having a lubricant located exterior of the dynamic sealing lip 14.

In the alternate embodiments of FIGS. 5–5C, minimum dimension 24 from non-hydrodynamic circular edge 18 to theoretical intersection 22 is greater than $\frac{1}{16}$ inch and preferably 0.09 inch or greater, thereby providing improvements in extrusion resistance and abrasion resistance as discussed in conjunction with the preferred embodiment. Counter-clockwise twist resistance is also improved over the prior art of U.S. Pat. No. 4,610,319 owing to the average dimension 25 being wider compared to the prior art.

As can be seen in the fragmentary longitudinal cross-sectional illustration of FIGS. 5A–5D, the intersection of angulated flank 20 and dynamic sealing surface 16 is blended by a hydrodynamic inlet curve 52 which is preferably tangent to both. In the alternate embodiments of FIGS. 5A–5D, the hydrodynamic inlet curve, which is hydrodynamic inlet curve 52, as viewed in longitudinal cross-section, can have a rate of curvature less than that of a $\frac{1}{8}$ radius (for example a $\frac{5}{32}$ inch radius), as with the preferred embodiment of FIGS. 2 and 2A, thereby attaining similar benefits to those described in conjunction with the large hydrodynamic inlet curve 52 of FIGS. 2 and 2A. Alternately, in the alternate embodiments of FIGS. 5A–5D, the hydrodynamic inlet radius, which is hydrodynamic inlet curve 52, as viewed in longitudinal cross-section, can as a simplification over the preferred embodiment, have a higher rate of curvature (i.e. a smaller radius) than the preferred hydrodynamic inlet curve 52 of the preferred embodiment.

Even though the seals of FIGS. 5–5C are simplified compared to the preferred embodiment, by incorporating a minimum dimension 24 from non-hydrodynamic circular edge 18 to theoretical intersection 22 of greater than $\frac{1}{16}$ inch and preferably 0.09 inch or greater of the preferred embodiment, these seals are able to take advantage of the lowered interfacial contact pressure and improved abrasion and extrusion resistance discussed in conjunction with the preferred embodiment.

This invention, as disclosed in conjunction with FIGS. 2–5D, has application where relatively rotatable surfaces are sealed with respect to a housing with either the housing or the relatively rotatable surface, or both, being the rotary member. The dynamic sealing surface 16 and the generally opposed static sealing surface 6 can be on the inside and the outside of the seal cross-sectional shape when the seal is compressed in the radial direction between substantially cylindrical counter-surfaces, with the dynamic sealing surface 16 being located on the opposite periphery. Alternatively, the dynamic sealing surface 16 and the generally opposed static sealing surface 6 can be on opposite ends of the seal cross-sectional shape when the seal is compressed in an axial direction between relatively rotating substantially planar counter-surfaces.

Figure 6:
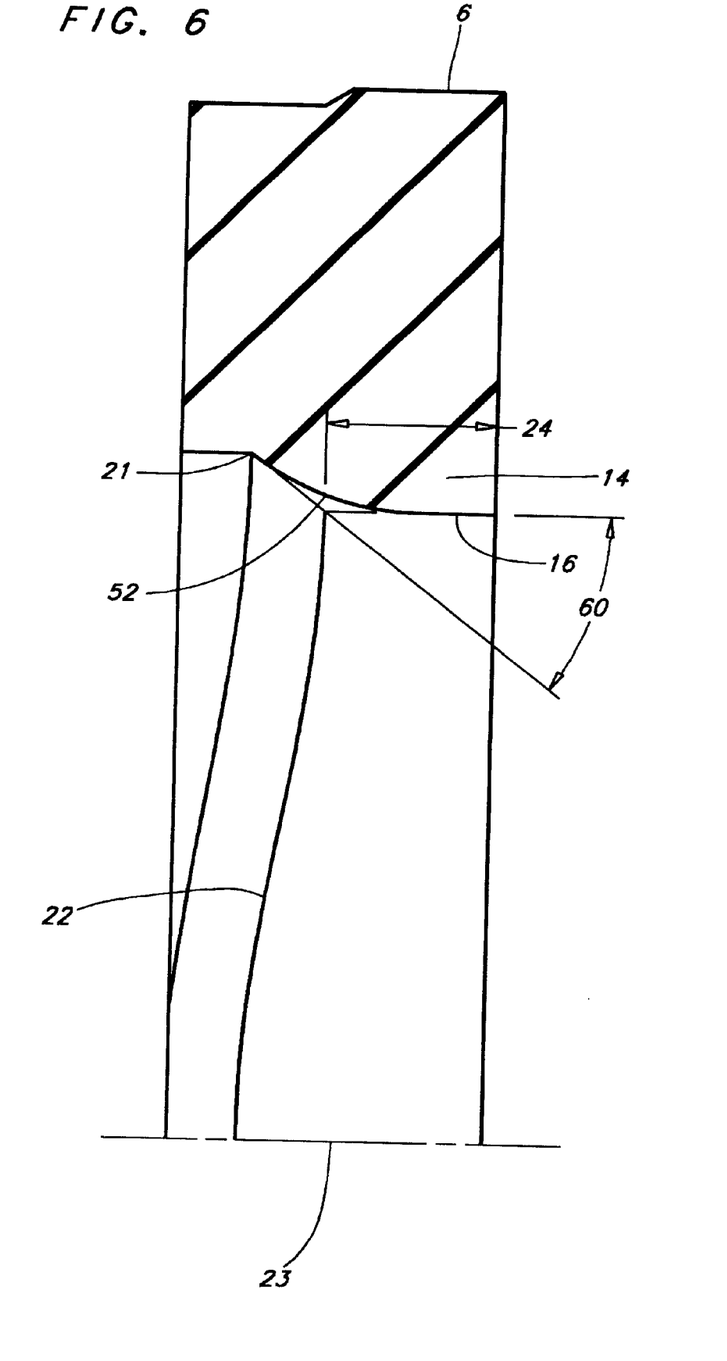
FIG. 6 is a partial longitudinal sectional view showing an alternative embodiment of the present invention wherein the angulated flank of the dynamic sealing lip is formed by the hydrodynamic curvature itself which extends all the way to lip termination point.

Description Of The Alternative Embodiment Of FIG. 6

In the discussion of the previous figures, the minimum dimension 24 was based on the theoretical intersection 22 between the flank angle 60 and the dynamic sealing surface 16, where the flank angle was based upon the angle of the angulated flank 20, and the angulated flank 20 took the form of a straight line in the longitudinal cross-sectional view of the seal. As can be seen from the previous figures, the flank angle 60 is tangent to hydrodynamic inlet curve 52.

In the alternate embodiment of FIG. 6, the angulated flank is actually formed by the hydrodynamic inlet curve 52 itself, which extends all the way to lip termination point 21. As in the previous figures, in the embodiment of FIG. 6 the flank angle 60 is tangent to hydrodynamic inlet curve 52, and the minimum dimension 24 is based upon the theoretical intersection 22 between the flank angle 60 and the dynamic sealing surface 16.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A generally circular hydrodynamically lubricating seal, comprising:

(a) a generally circular seal body having a static sealing surface; and (b) a compression-type dynamic sealing lip projecting from said generally circular seal body and defining a dynamic sealing surface, a generally circular non-hydrodynamic edge and a non-circular angulated flank;

(c) said non-circular angulated flank defining a flank angle;

(d) said flank angle and said dynamic sealing surface having theoretical intersection;

(e) said theoretical intersection being positioned from said generally circular non-hydrodynamic edge by a variable distance having a minimum dimension and a maximum dimension; and (f) said minimum dimension being greater than $\frac{1}{16}$ inch.

2. The generally circular hydrodynamically lubricating seal of claim 1, comprising:
(a) said generally circular seal body defining a theoretical center-line; and
(b) when said generally circular seal body is viewed in a longitudinal cross-section taken along said theoretical center-line, a hydrodynamic inlet curve blending said theoretical intersection between said flank angle and said dynamic sealing surface, said hydrodynamic inlet curve being tangent to said dynamic sealing surface at a location of tangency, the shortest distance between said location of tangency and said generally circular non-hydrodynamic edge being greater than 0.045 inches.

3. The generally circular hydrodynamically lubricating seal of claim 1, comprising:
said generally circular seal body being composed of resilient material having a nominal hardness in the range of from about 73 to about 92 Durometer Shore A.

4. The generally circular hydrodynamically lubricating seal of claim 1, comprising:
a static sealing lip being defined by said generally circular seal body and defining said static sealing surface.

5. A generally circular hydrodynamically lubricating seal, comprising:
(a) a generally circular seal body having a static sealing surface; and
(b) a dynamic sealing lip projecting from said generally circular seal body and defining a dynamic sealing surface, a generally circular non-hydrodynamic edge and a non-circular angulated flank defining a flank angle;
(c) said flank angle and said dynamic sealing surface having theoretical intersection being positioned from said generally circular non-hydrodynamic edge by a variable distance having a minimum dimension and a maximum dimension, said minimum dimension being greater than 1/16 inch; and
(d) said non circular angulated flank defining a number of waves less than the rounded result of the circumference of the dynamic sealing surface divided by 1.1 inches.

6. The generally circular hydrodynamically lubricating seal of claim 1, comprising:
said compression-type dynamic sealing lip projecting substantially axially from said generally circular seal body and being oriented for face sealing.

7. The generally circular hydrodynamically lubricating seal of claim 1, comprising:
said compression-type dynamic sealing lip projecting substantially radially from said generally circular seal body.

8. The generally circular hydrodynamically lubricating seal of claim 1, comprising:
(a) said generally circular seal body defining a theoretical centerline; and
(b) when said generally circular seal body is viewed in a longitudinal cross-section taken along said theoretical center-line, the intersection of said longitudinal cross-section and said non-circular angulated flank forming a straight line.

9. The generally circular hydrodynamically lubricating seal of claim 1, comprising:
(a) said generally circular seal body defining a theoretical center-line; and
(b) when said generally circular seal body is viewed in a longitudinal cross-section taken along said theoretical center-line, a hydrodynamic inlet curve blending said theoretical intersection between said flank angle and said dynamic sealing surface, said hydrodynamic inlet curve being tangent to said dynamic sealing surface at a location of tangency.

10. The generally circular hydrodynamically lubricating seal of claim 9, comprising:
the rate of curvature of said hydrodynamic inlet curve being less than the rate of curvature of a 1/8 inch radius.

11. The generally circular hydrodynamically lubricating seal of claim 10, comprising:
the rate of curvature of said hydrodynamically inlet curve being less than the rate of curvature of a 5/32 inch radius.

12. The generally circular hydrodynamically lubricating seal of claim 9, comprising:
said non-circular angulated flank, in the non-compressed condition of said hydrodynamically lubricating seal, being formed by said hydrodynamic inlet curve.

13. The generally circular hydrodynamically lubricating seal of claim 9, comprising:
said hydrodynamic inlet curve being tangent to said flank angle.

14. The generally circular hydrodynamically lubricating seal of claim 9, wherein:
said hydrodynamic inlet curve, in the non-compressed condition of said hydrodynamically lubricating seal, is a portion of an ellipse.

15. The generally circular hydrodynamically lubricating seal of claim 1, comprising:
the ratio of said maximum dimension divided by said minimum dimension being less than 1.8:1.

16. The generally circular hydrodynamically lubricating seal of claim 1, comprising:
the ratio of said maximum dimension divided by said minimum dimension being 1.67:1.

17. The generally circular hydrodynamically lubricating seal of claim 1, comprising:
said minimum distance being at least 0.09 inch.

18. The generally circular hydrodynamically lubricating seal of claim 1, comprising:
said minimum distance being at least 0.12 inch.

19. A generally circular hydrodynamically lubricating seal, comprising:
(a) a generally circular seal body having a static sealing surface; and
(b) a compression-type dynamic sealing lip projecting from said generally circular seal body and defining a dynamic sealing surface; a generally circular non-hydrodynamic edge and a non-circular angulated flank;
(c) said non-circular angulated flank defining a flank angle;
(d) said flank angle and said dynamic sealing surface having theoretical intersection;
(e) said theoretical intersection being positioned from said generally circular non-hydrodynamic edge by a variable distance having a minimum dimension and a maximum dimension, said minimum dimension being greater than 1/16 inch;
(f) said generally circular seal body defining a theoretical center-line; and
(g) a hydrodynamic inlet curve blending said theoretical intersection between said flank angle and said dynamic sealing surface, said hydrodynamic inlet curve being tangent to said dynamic sealing surface at a location of tangency, the rate of curvature of said hydrodynamic inlet curve being less than the rate of curvature of a 1/8 inch radius when said hydrodynamic inlet curve is viewed in a longitudinal cross-section taken along said theoretical center-line.

20. A generally circular hydrodynamically lubricating seal, comprising:
   (a) a generally circular seal body having a static sealing surface; and
   (b) a compression-type dynamic sealing lip projecting from said generally circular seal body and defining a dynamic sealing surface, a generally circular non-hydrodynamic edge and a non-circular angulated flank;
   (c) said non-circular angulated flank defining a flank angle;
   (d) said flank angle and said dynamic sealing surface having theoretical intersection;
   (e) said generally circular seal body defining a theoretical center-line; and
   (h) a hydrodynamic inlet curve blending said theoretical intersection between said flank angle and said dynamic sealing surface, said hydrodynamic inlet curve being tangent to said dynamic sealing surface at a location of tangency, the rate of curvature of said hydrodynamic inlet curve being less than the rate of curvature of a 1/8 inch radius when said hydrodynamic inlet curve is viewed in a longitudinal cross-section taken along said theoretical center-line.

21. The generally circular hydrodynamically lubricating seal of claim 20, wherein:
   the rate of curvature of said hydrodynamic inlet curve being less than the rate of curvature of a 5/32 inch radius.

* * * * *

UNITED STATES PATENT AND TRADEMARK OFFICE
CERTIFICATE OF CORRECTION

PATENT NO. : 6,382,634 B1
DATED : May 7, 2002
INVENTOR(S) : Lannie L. Dietle and Manmohan S. Kalsi It is certified that error appears in the above-identified patent and that said Letters Patent is hereby corrected as shown below:

Column 10,
Line 8, delete "3E", insert -- 2E --

Column 13,
Line 14, delete "1:8:1", insert -- 1.8:1 --
Line 14, delete "1:67:1", insert -- 1.67.1 --

Column 20,
Line 37, after "1.67:1", insert -- or less --

Signed and Sealed this

Twelfth Day of November, 2002

Attest:

Attesting Officer

JAMES E. ROGAN
Director of the United States Patent and Trademark Office